(12) United States Patent
Pao et al.

(10) Patent No.: US 6,345,927 B1
(45) Date of Patent: Feb. 12, 2002

(54) WELD REINFORCEMENT

(75) Inventors: Hsueh-Wen Pao, Saratoga; Jack T. Matsumoto, Sunnyvale; David B. Drendel, San Jose; David W. Sandusky, Los Gatos, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/520,992

(22) Filed: Mar. 8, 2000

(51) Int. Cl.[7] .................................................. F16B 12/36
(52) U.S. Cl. ....................... 403/294; 403/341; 403/408.1
(58) Field of Search .................................. 403/292, 293, 403/294, 341, 408.1, 371

(56) References Cited

U.S. PATENT DOCUMENTS

| | | | | |
|---|---|---|---|---|
| 1,802,829 A | * | 4/1931 | Pierce ........................ 403/294 |
| 4,560,059 A | * | 12/1985 | Braun et al. ................. 403/316 |
| 4,733,771 A | * | 3/1988 | Grundken et al. ........ 198/735.6 |
| 4,836,717 A | * | 6/1989 | Landaeus et al. ........... 403/294 |
| 5,333,557 A | * | 8/1994 | Eickhoff ..................... 403/293 |
| 5,474,403 A | * | 12/1995 | Hetrich ....................... 403/371 |
| 5,995,574 A | * | 11/1999 | Matsumoto et al. ........ 376/287 |

\* cited by examiner

*Primary Examiner*—Lynne H. Browne
*Assistant Examiner*—Aaron Dunwoody
(74) *Attorney, Agent, or Firm*—Nixon & Vanderhye

(57) ABSTRACT

The weld reinforcement includes a generally dogbone-shaped pocket having laterally enlarged end portions and a reduced intermediate portion spanning a weld seam. A complementary-shaped reinforcing element is received in the pocket. The pocket includes a projection which is received in an opening in the overlying reinforcing element. A wedge-type clamp retainer is received about the projection within the opening to secure the element within the pocket.

15 Claims, 6 Drawing Sheets

WELD REINFORCEMENT

BACKGROUND OF THE INVENTION

The present invention relates to reinforcing apparatus for a weld seam and particularly relates to a compact, remotely installable weld reinforcement device for maintaining structural integrity of welded members in the event of weld failure, for example, in a nuclear reactor.

A weld seam is typically formed between adjacent abutting welded members. For example, in a boiling water nuclear reactor pressure vessel, a cylindrical shroud is used to direct water flow through the fuel core. The bottom of the shroud is attached to a shroud support structure which is welded to the bottom of the pressure vessel. The shroud support structure consists of a baffle plate, cylinder and support legs. The baffle plate and cylinder separate the water flow through the annulus between the pressure vessel and shroud and the inside of the shroud. The shroud is a structural component used to support the core plate, top guide grid and shroud head/separator. The shroud consists of several stacked cylindrical sections typically constructed by welding together formed or rolled plates. Conventionally, each cylindrical section is made from two or three plates. The cylindrical sections are also of varying diameters. The transition between the different diameter cylinders is constructed by welding a circular ledge, e.g., a flat ring, between the ends of the cylinder sections. Thus, the shroud contains multiple vertical and circumferential welds.

The core plate which is bolted to the middle section of the shroud is used to laterally support the lower end of the fuel assemblies and the upper end of control rod guide tubes. The core plate also functions as a baffle plate to direct core flow through the fuel assemblies. The directing of the core flow creates a differential pressure across the core plate. Thus, the core plate is designed to support vertical and horizontal loads which, in turn, are transferred to a shroud. Also bolted to the upper section of the shroud is the shroud head/separator. The shroud head/separator is used to remove moisture from the steam created within the core. The moisture separation causes a pressure drop through the shroud head/separator and thus creates an upward load which is transferred to the shroud. During operating conditions and/or seismic events, both horizontal and vertical loads must be transferred through the shroud and the multiple welds which are used to construct the shroud. Failure of a weld can result in loss of integrity of the shroud, proper support for the core/core internals and may require shutdown of the nuclear plant.

Shroud repair hardware to maintain the integrity of the shroud in the event of failure of the welds has been designed in the past. For example, brackets have been bolted to the outside of the shroud to bridge across the circumferential weld joints. The brackets were installed on the outside of the shroud in the annulus. The installation required that for each bracket four holes be machined through the shroud. This repair was designed to provide an alternate load path to circumferential weld joints. This type of apparatus, however, limited access into the annulus between the core shroud and the pressure vessel.

Another example of repair hardware involved use of multiple tie rods which connect the upper end of the shroud to the shroud support. The material used for the tie rods had a lower coefficient of thermal expansion than that of the shroud material. Bumpers of various geometries had been used to provide lateral support between the pressure vessel and the outside of the shroud. Typically, a bumper is placed at the elevation of the top guide grid, core plate and shroud to shroud support joint. This method, as in the prior method, likewise limited access into the annular region. Some designs also required removal of the repair hardware to enable access to the jet pump inlet mixers and also limited access for inspection of the pressure vessel from the inside. Accordingly, there has developed a need to provide an alternate load path across a weld joint, either circumferential and/or vertical, in a shroud weld to carry tensile and shear loads in the event of weld failure and which would meet original design requirements placed on the shroud without change in outline geometry of the shroud and annulus to maintain access, while simultaneously affording remote installation with minimum size and mass of the repair and minimum installation time.

BRIEF SUMMARY OF THE INVENTION

In accordance with a preferred embodiment of the present invention, a pocket, preferably in the shape of an I-beam or dogbone, is formed, e.g., machined into the adjoining surfaces of the welded members to a predetermined depth, with the reduced intermediate section of the pocket straddling the weld seam. The pocket may be located on the inside or outside of the welded members, e.g., the members of the shroud of a nuclear reactor. The edges of the pocket may be straight or slightly tapered. The edges adjacent and parallel to the weld seam, however, are preferably tapered. A projection, for example, a cylindrical section within the pocket at one or both ends of the pocket, is provided, e.g., left unmachined and hence projects from the base of the pocket toward the surface of the members.

A generally complementary-shaped, e.g., I-beam or dogbone-shaped, bracket or element is provided and placed in the pocket. The edges of the element adjacent to and parallel to the weld seam are tapered complementary to the taper of the edges of the pocket. This taper allows for a zero clearance fit-up between the pocket and the element along an axis perpendicular to the weld seam. A small clearance between the element and the pocket is provided along an axis parallel to the weld seam to facilitate installation of the bracket. The element also has a clearance hole aligned with the projection in the pocket.

To retain the element in the pocket, a retaining clamp is installed into the hole in the element and around the projection left in the pocket. The retaining clamp may comprise a wedge overlying a sleeve and a driver, for example, a nut, screw threaded to the sleeve and disposed in the annular opening about the projection. By threading the nut and sleeve, the clamp wedge expands between the bore of the hole and the outside of the projection due to the tapered design of the wedge and sleeve. The retaining clamp is required to secure the element during non-operating/startup conditions. An ancillary locking feature may be inmcluded as part of the retaining clamp, if desired.

Preferably, the coefficient of thermal expansion of the material of the element is lower than the coefficient of expansion of the material of the shroud, i.e., the joined members. Thus, during heatup/operation of the plant, the element will be placed in tension and the shroud weld joint in compression. Thus, the load path perpendicular to the weld seam is carried through the element as a tensile load, while the load applied parallel to the weld seam is transferred as a shear load through the cross-section of the element.

In a further embodiment of the present invention, the enlarged pocket portions at opposite ends of the pocket may have holes through to the opposite surface of the joined members. Bolts may be installed from the opposite side of the members and received through openings of the element. Nuts may be applied to the bolts to retain the elements in the pockets. In this embodiment, loads applied normal to the plane of the shroud surface may be transferred through the element and bolt assemblies. This design is particularly useful where access to both sides of the shroud is available.

A further option is to apply a cladding or plate over the element and shroud. The cladding or plate would eliminate the need for a clamp retainer or bolt assemblies.

It will be appreciated that the size, material and quantity of the elements and clamp retainers or bolts/nuts required for each weld seam is based on the required load that must be transmitted by the weld seam. Also, the outside contour of the element may be flat or curved to match the radius of the shroud.

In a preferred embodiment according to the present invention, there is provided a weld reinforcement comprising first and second members welded to one another forming an elongated weld seam, a continuous pocket formed in the members opening through corresponding surfaces thereof and defining first and second pocket portions on opposite sides of the weld seam, the first pocket portion adjacent one end of the pocket having a laterally enlarged recess spaced from the seam and a laterally reduced portion adjoining the seam, the second pocket portion having a laterally reduced portion adjacent the seam, one of the pocket portions of the one member having a projection extending from a base of the one pocket portion and in a direction toward the surface of the one member, a reinforcing element including laterally enlarged end portions connected to one another by a laterally reduced intermediate portion, one of the enlarged end portions of the element being received in the first pocket portion with the reduced intermediate portion of the element in the reduced pocket portion spanning the weld seam and a retainer engaging the projection to retain the element in the pocket spanning the weld seam.

In a further embodiment according to the present invention, there is provided a weld reinforcement comprising first and second members welded to one another forming an elongated weld seam, a continuous pocket formed in the members opening through corresponding surfaces thereof and defining first and second pocket portions on opposite sides of the weld seam, the first pocket portion having a laterally enlarged recess spaced from the seam and a reduced portion adjoining the seam, the second pocket portion having a laterally reduced portion adjacent the seam, a reinforcing element including laterally enlarged end portions connected to one another by a laterally reduced intermediate portion, one of the enlarged end portions of the element being received in the first pocket portion with the reduced intermediate portion of the element in the pocket spanning the weld seam and a cladding overlying the element and the first and second members along the surfaces thereof.

In a still further preferred embodiment according to the present invention, there is provided a weld reinforcement comprising first and second members welded to one another forming an elongated weld seam, a continuous, generally dogbone-shaped pocket formed in the members opening through corresponding surfaces thereof and defining first and second laterally enlarged recesses on opposite sides of the weld seam and joined to one another by a laterally reduced intermediate pocket section overlying the seam, a generally dogbone-shaped reinforcing element generally complementary in shape to the dogbone-shaped pocket and disposed in the pocket, the element including laterally enlarged end portions connected one to another by a laterally reduced intermediate section, the first and second pocket portions each having at least one edge extending generally parallel to the elongated weld seam and tapering away from the pocket portion in a direction from the base to the surface of the member, the enlarged end portions of the dogbone-shaped reinforcing element each having at least one edge extending generally parallel to the elongated weld seam and having a taper generally complementary to the taper of the associated pocket portion and means for retaining the dogbone-shaped reinforcing element in the pocket.

DETAILED DESCRIPTION OF THE INVENTION

Figure 1:
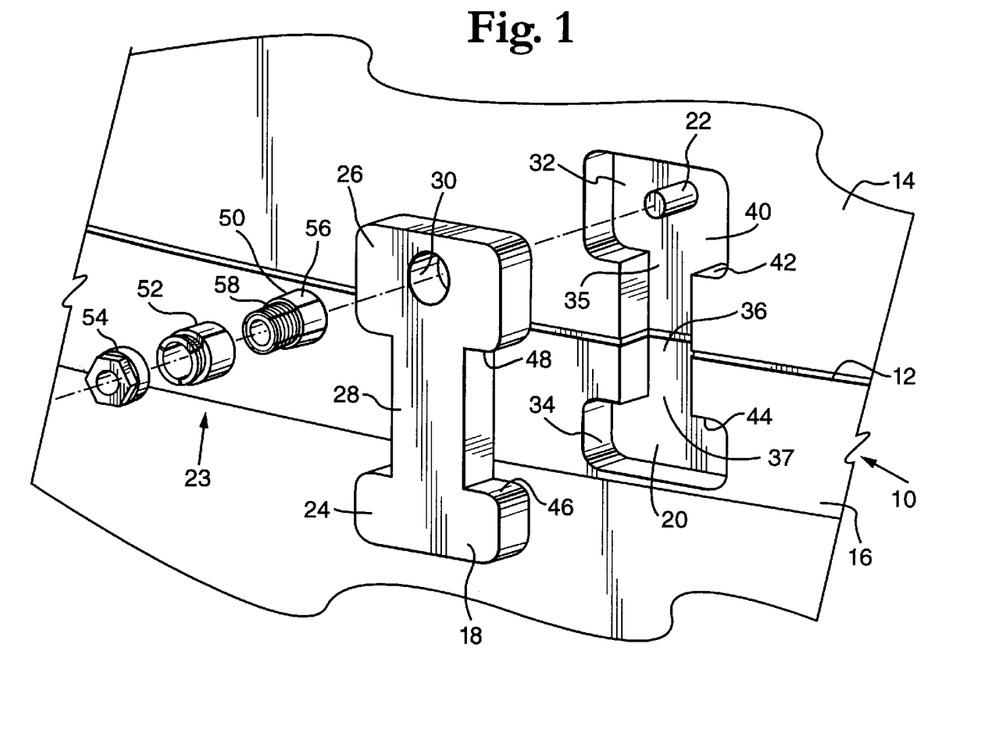
FIG. 1 is a fragmentary perspective view with parts broken out illustrating a weld reinforcement according to the present invention.

Referring to the drawings, particularly to FIG. 1, there is illustrated a weld reinforcement, generally designated 10, for reinforcing a weld joint 12 between a pair of members 14 and 16, in this instance, the members being welded together along a horizontal weld joint 12. The members 14 and 16 are illustrated as cylindrical members, i.e., the cylindrical member 14 being superposed over the cylindrical member 16 with the members welded to one another. The weld reinforcement 10 generally includes a reinforcing element 18, for example, a bracket, for reception in a pocket 20 formed in the members 14 and 16. A projection 22 lies within the pocket 20 and a retaining clamp, generally indicated 23, secures the element 18 within the pocket 20 as described below. It will be appreciated that the weld reinforcement 10 may be applied at multiple locations along the members welded to one another.

The reinforcing element 18 is in the shape of a dogbone or I-beam having laterally enlarged end portions 24 and 26 and a laterally reduced intermediate portion 28. A through opening 30 is provided at least at one end of the element 18 for receiving the projection 22 and the retaining clamp 23 as described below.

The pocket 20 is shaped generally complementary to the reinforcing element 18. That is, the pocket has laterally enlarged end portions 32 and 34 in the members 14 and 16 and an intermediate portion 36 spanning between the end portions 32 and 34 and crossing over the weld seam 12. Thus, the pocket 20 has a first pocket portion 35 including end portion 32 and part of the intermediate portion 36 and a second pocket portion 37 including end portion 34 and another adjoining part of the reduced intermediate portion 36. The pocket is formed in the members 14 and 16 to a predetermined depth, leaving a surface 40 forming the base of the pocket. While the edges of the pocket 20 may be straight or slightly tapered, the edges of the pocket adjacent and parallel to the weld seam are preferably tapered outwardly from the base 40. Thus, the surfaces 42 and 44 taper outwardly from base 40 in a direction enlarging the end portions of the pocket as indicated by the angle α in a further embodiment of the invention illustrated in FIG. 2B. The remaining surfaces, e.g., surfaces 43 and 45, and particularly those parallel to the weld seam, may likewise be tapered in the opposite direction.

To form the pocket 20, the material of the members 14 and 16 are preferably machined for removal, leaving the projection 22 unmachined. Consequently, the projection 22 preferably comprises an integral portion of the member 14.

The bracket 18 is configured generally complementary to the shape of the pocket 20. Thus, the edges of the bracket 18 parallel to the weld seam 12 and particularly the inside edges 46 and 48 are tapered complementary relative to the corresponding edges of the pocket 20. For example, edges 46 and 48 are tapered complementary to edges 42 and 44, respectively, while the parallel edges opposite thereto are complementary to the edges 43 and 45, respectively, as illustrated in the further embodiment of FIG. 2B. The tapers allow for zero clearance between the pocket and bracket along an axis perpendicular to the weld. A small clearance between the bracket and pocket exists along an axis parallel to the weld to facilitate installation of the reinforcing element in the pocket. The opening 30 is, of course, aligned with the projection 22 and receives the projection 22 with a clearance sufficient to receive the retainer clamp 23 in the annulus about the projection 22.

The retainer clamp 23 includes a split sleeve 50, a wedge 52 and a retaining nut 54. The split sleeve 50 has an outer outwardly tapered surface 56 and a threaded cylindrical surface 58. The wedge 52 is split and has an internally threaded surface for engaging the threads 58 of the sleeve 50. The outer end of the wedge includes an annular shoulder for reception in an annular slot in the nut 54. By applying torque to the nut of the retaining clamp 23, the clamp expands between the bore of the opening 30 and the projection 22. As the clamp is tightened by threading the nut 54, the wedges of the wedge 52 move axially along the sleeve 50 and, in turn, the bracket 18 is retained in the pocket 20.

The coefficient of thermal expansion of the material of the reinforcing element 18 is chosen to be lower than the coefficient of thermal expansion of the members 14 and 16. During heat-up in the operation of the plant, the reinforcing element 18 will therefore be in tension and the shroud weld joint in compression. Thus, the load path perpendicular to the weld seam is carried through the reinforcing element as a tensile load. The load applied parallel to the weld seam is transferred as a shear load through the cross-section of the reinforcing element 24.

Figure 2A:
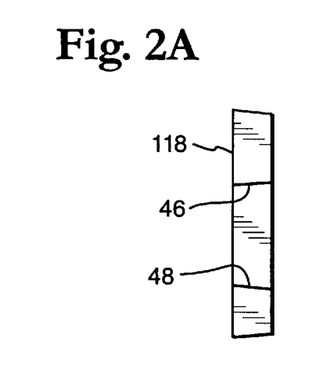
FIG. 2A is a side elevational view of a bracket useful to reinforce the weld joint illustrated in cross-section in FIG. 2B.
Figure 2B:
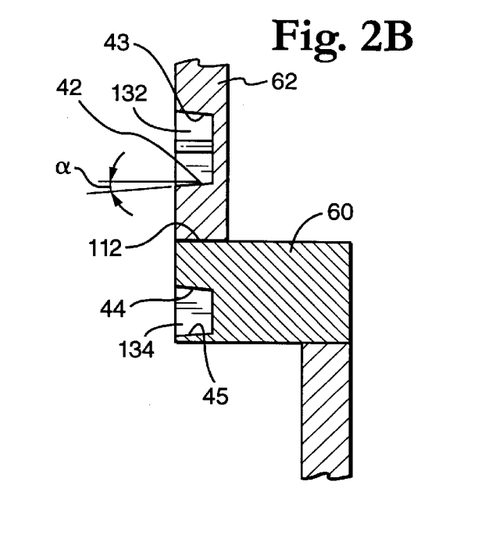
FIG. 2B is a fragmentary cross-sectional view of a welded joint to which a reinforcement bracket is applied to reinforce the joint.
Figure 3:
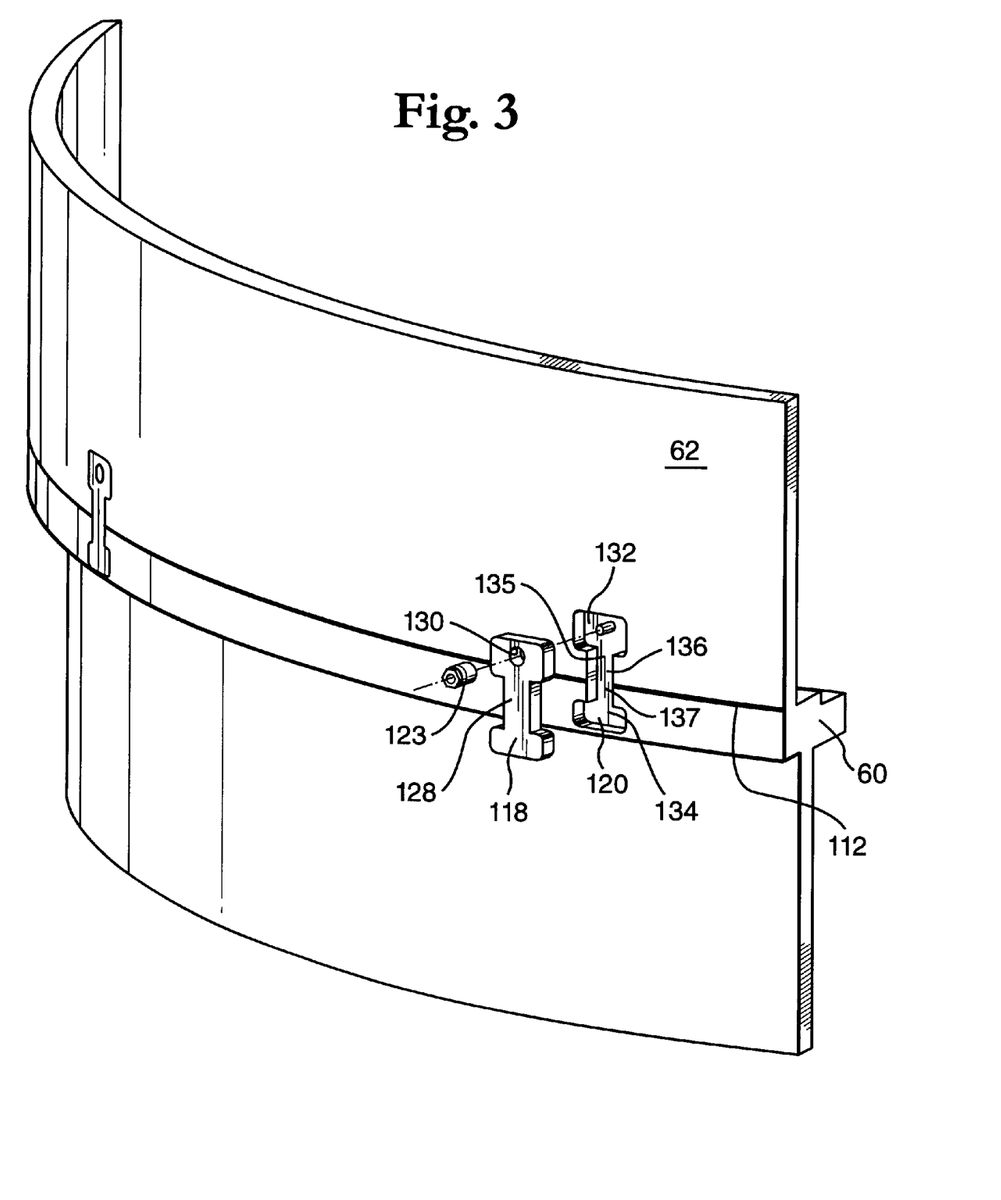
FIG. 3 is a fragmentary perspective view of a portion of a cylindrical welded shroud illustrating the reinforcement thereof.

While the weld reinforcement of FIG. 1 is applicable to reinforcing members 14 and 16 forming continuations of one another across the weld seam 12, the embodiment of FIGS. 2A, 2B and 3 employs a similar weld reinforcement between members oriented at right angles to one another. In this embodiment, like parts as in the preceding embodiment, are identified with like reference numerals having the numeral prefix 1. As illustrated in FIGS. 2A, 2B and 3, a horizontally extending ring 60 is welded to a vertically oriented member 62 along a horizontal weld seam. A pocket 120 (FIG. 3) is formed which extends along the outer surface of the member 62 and the outer edge of the ring member 60. Thus, the laterally enlarged recesses 132 and 134 at opposite ends of the pocket portions 135 and 137, respectively, reside in members 62 and 60, respectively, and the intermediate section 136 spans between those pocket portions 132 and 134 crossing over the weld seam 112. The reinforcing element 118 is similar to the element 18 illustrated in FIG. 1. It will also be appreciated that the margins of the pocket and reinforcing element are tapered similarly as in the embodiment hereof in FIG. 1. Further, the retaining clamp assembly 123 is employed to retain the reinforcing element 118 in the pocket 120 with like results as in the previous embodiment.

Figures 4A, 4B:
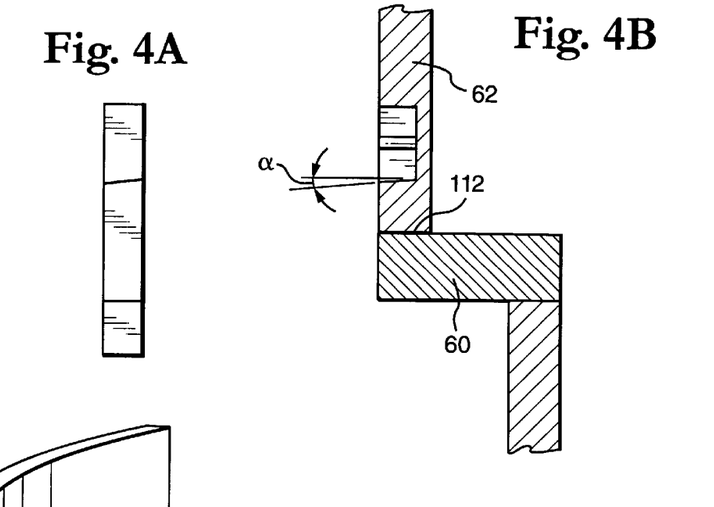
FIG. 4A is a side elevational view of a bracket.
FIG. 4B is a fragmentary cross-sectional view of a welded joint to which the bracket is applied to reinforce the joint.
Figure 5:
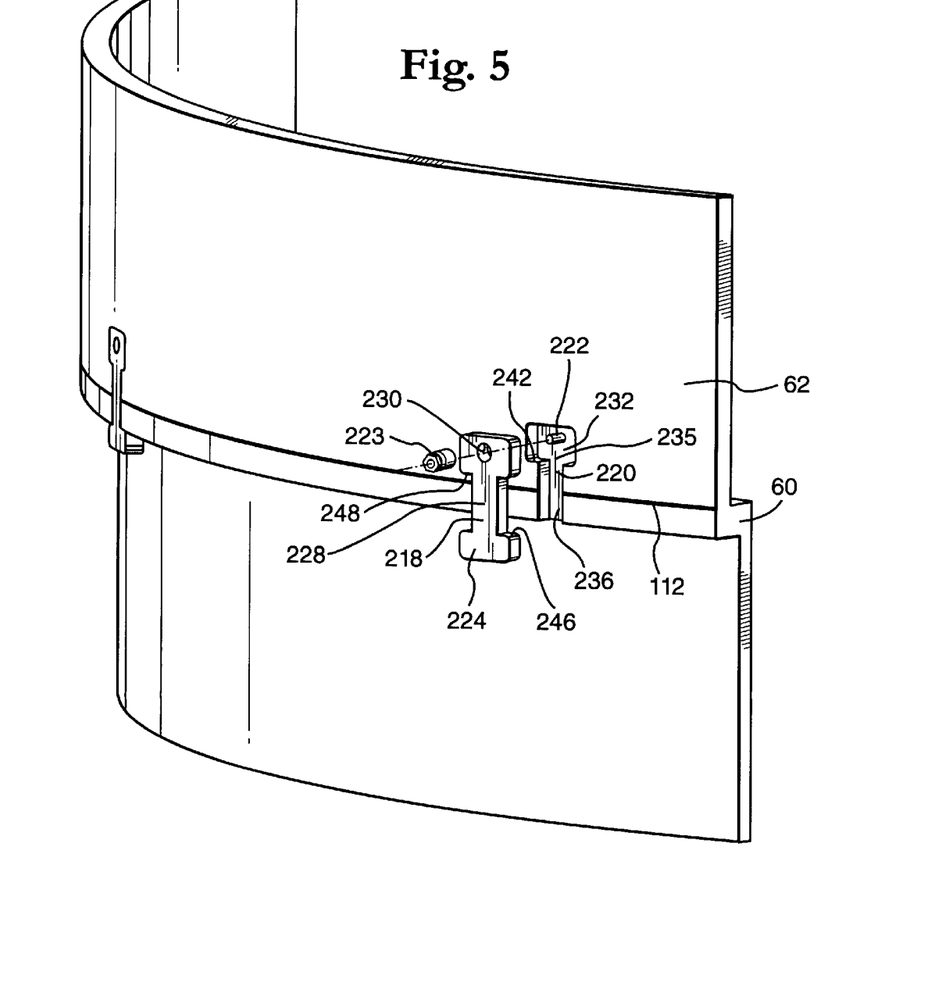
FIG. 5 is a fragmentary perspective view of a cylindrical shroud illustrating the reinforcement of FIGS. 4A and 4B applied to a shroud.

Referring now to the embodiment hereof illustrated in FIGS. 4A, 4B and 5, the weld reinforcement is similarly formed between a vertically extending member 62 and a horizontally extending member 60 as in the prior embodiment with a weld seam 112 therebetween. In this form, however, the horizontal member 60 has insufficient thickness in which to receive a full pocket. Accordingly, a pocket is formed in the member 62 and along an outer edge of the member 60. Thus, the intermediate pocket portion 236 extends from the laterally enlarged recess 232 in member 62 entirely through the edge of the member 60, with the result that the pocket 220 is essentially T-shaped in configuration and has only a pocket portion 135 including recess 232 and part of the intermediate pocket portion 236. The reinforcing element 218 is similar to the reinforcing elements of the prior embodiment, except that the lateral edge 246 of the lower laterally enlarged portion 224 is straight and not tapered. The upper edge 248, however, as well as the edge 242 defining the upper pocket portion 232 are tapered. Thus, the reinforcing element 218 is received within the enlarged upper pocket portion 232 and the intermediate pocket portion 220. The lower laterally enlarged portion 224 of element 218 underlies the member 60.

Figure 6:
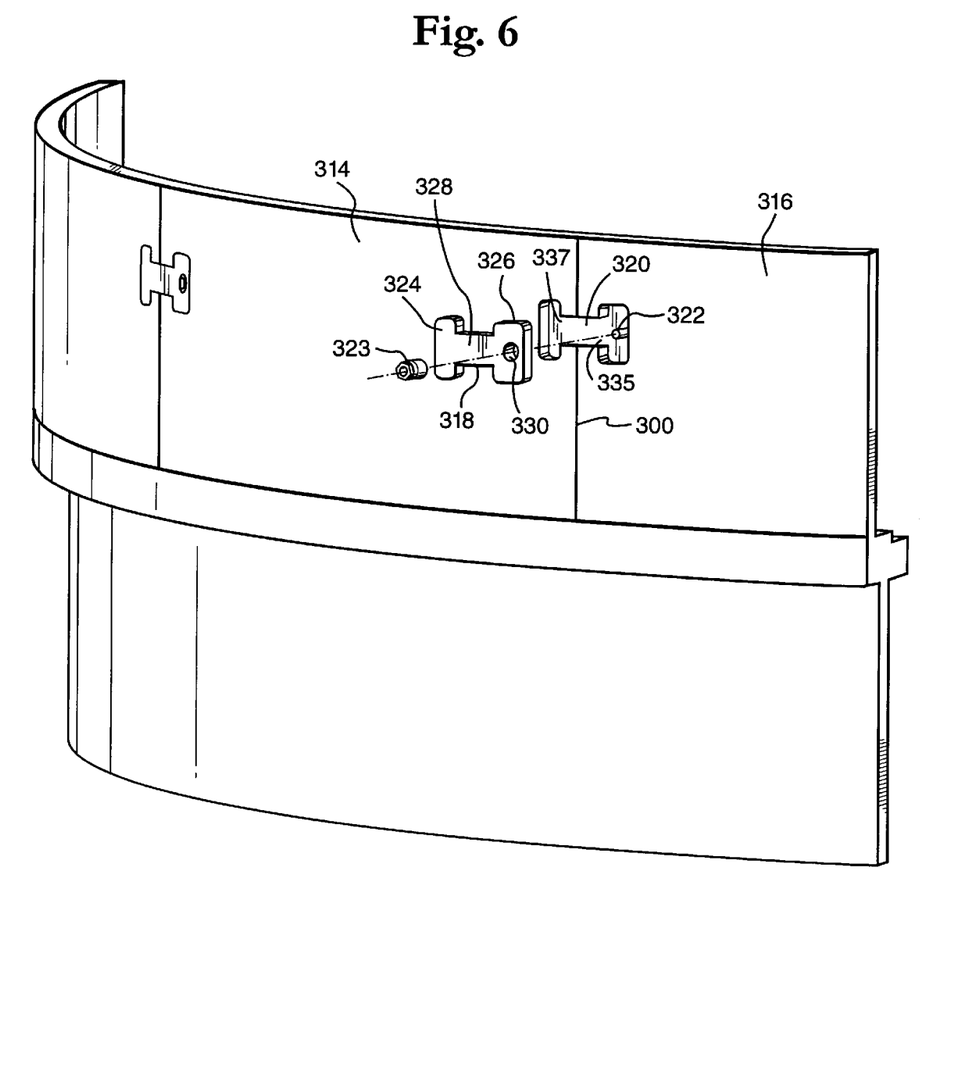
FIG. 6 is a view similar to FIG. 1 illustrating a weld reinforcement for a vertical weld seam.

Referring to the embodiment hereof illustrated in FIG. 6, the reinforcing element and pocket is identical to the corresponding parts illustrated in FIG. 1 except that the element and pocket are reoriented to lie horizontally, spanning a vertical weld seam 300 between members 314 and 316. Thus, in this embodiment, like numerals are applied to like parts as in the prior embodiment of FIG. 1 preceded by the numeral 3. Accordingly, the dogbone-shaped element 318 having enlarged end portions 324 and 326 and a reduced intermediate portion 328 is received within the generally complementary-shaped pocket 320. The projection 322 is received within the opening 330 and the retainer clamp 323 is similarly applied about projection 322 to retain element 318 in pocket 320.

Figure 7:
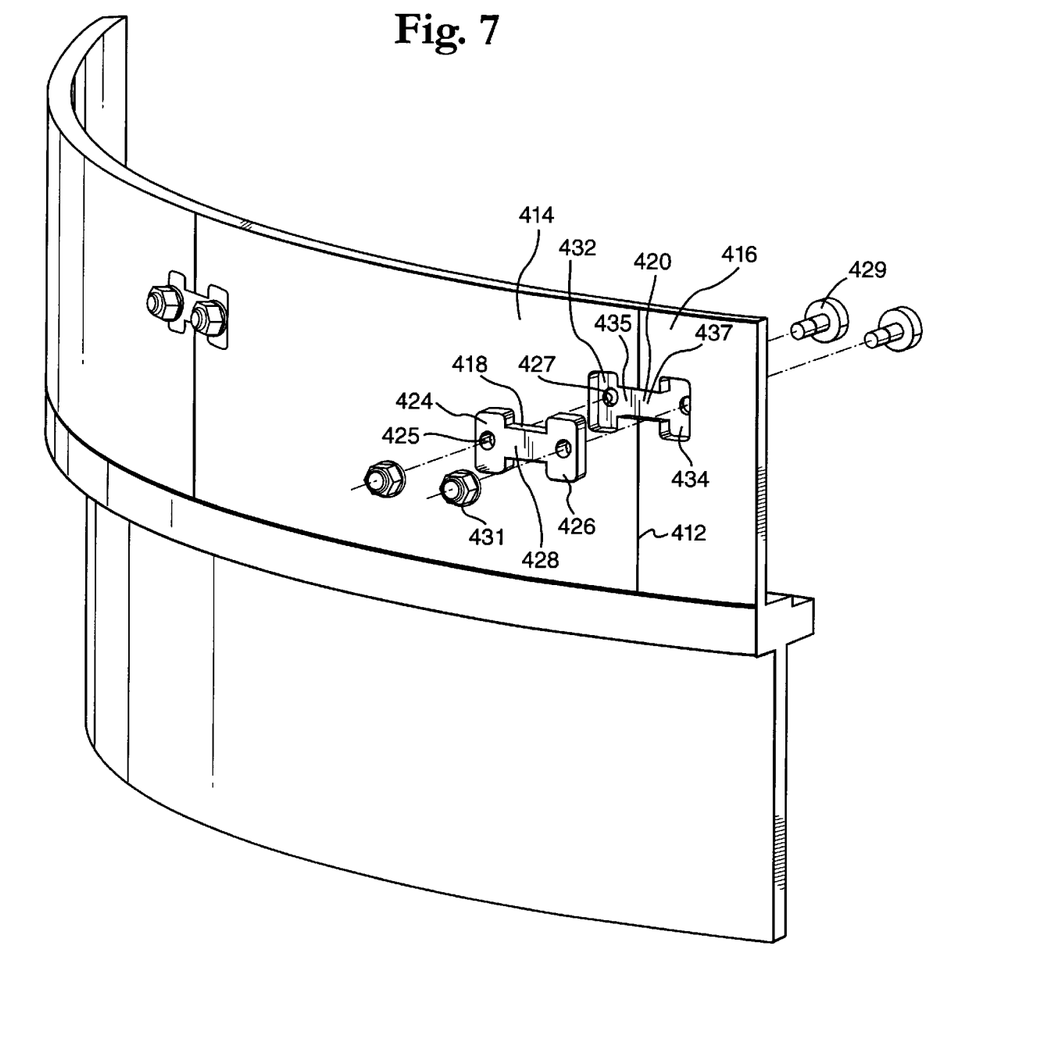
FIG. 7 is a view similar to FIG. 6 illustrating a further embodiment of the weld reinforcement.

A still further embodiment of the present invention is illustrated in FIG. 7 with parts corresponding to the embodiment of FIG. 1 preceded by the numeral 4. Instead of machining the projections, for example, projection 22, from the metal of the member or members, however, the base portion of the pocket 420 can be formed to receive an aperture 427. In FIG. 7, two apertures 427 are illustrated at opposite ends of the pocket 420 in the laterally enlarged recesses 432 and 434 forming parts of pocket portions 435 and 437. The apertures 427 receive bolts 429. The bolts pass through the apertures 427 from one side of the members 414 and 416 and through the openings 425 in the laterally enlarged end portions 424 and 426 of the reinforcing element 418 to receive threaded nuts 431. In this manner, the reinforcing element 418 is secured to the members welded to one another with the elements spanning the weld seam 412.

Figure 8:
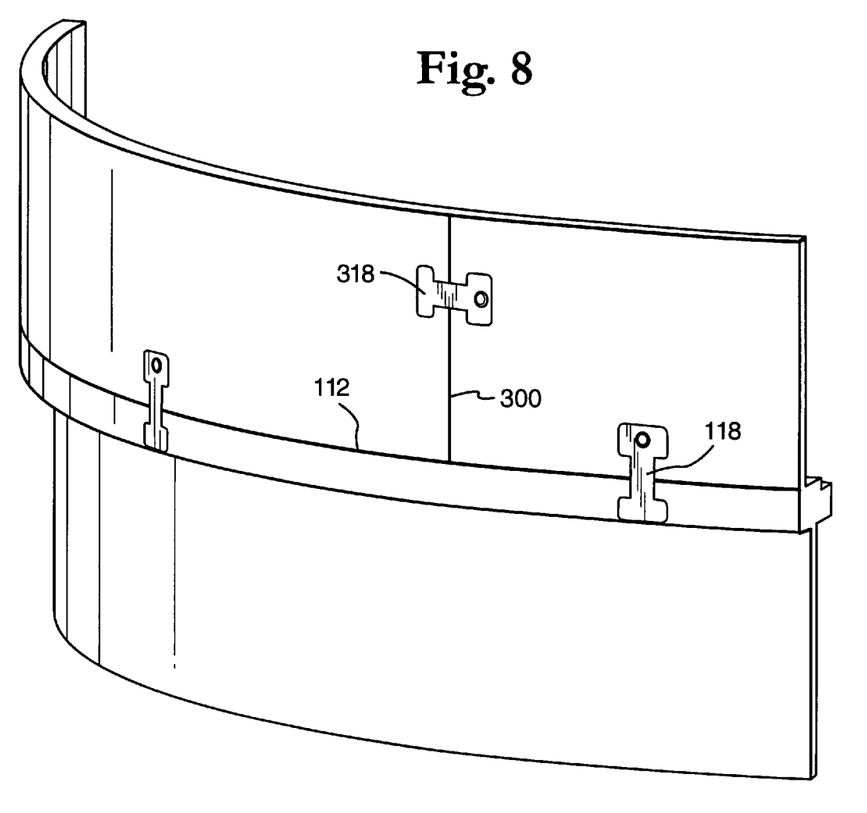
FIG. 8 is a perspective view illustrating weld reinforcements according to the present invention in vertical and horizontal weld joints.

FIG. 8 illustrates the weld reinforcements hereof in both vertical and horizontal weld seams. For example, the vertical weld seam 300 is reinforced by the element 318 similarly as in FIG. 6. The horizontal seam 112 is similarly reinforced by the arrangement illustrated in FIGS. 2A and 2B, including the weld reinforcing element 118. Thus, multiple reinforcing elements and pockets are used wherever weld reinforcements are necessary and in both vertical and horizontally extending weld seams or other directionally oriented weld seams. It will also be appreciated that the projection, for example, projection 22, may be duplicated in the opposite end of the pocket. In that form, the opening 30 may likewise be duplicated in the opposite end of the element 18 such that a pair of retainer clamps 23 may engage the respective projections 22 retaining the element 18 in the pocket.

Figure 9:
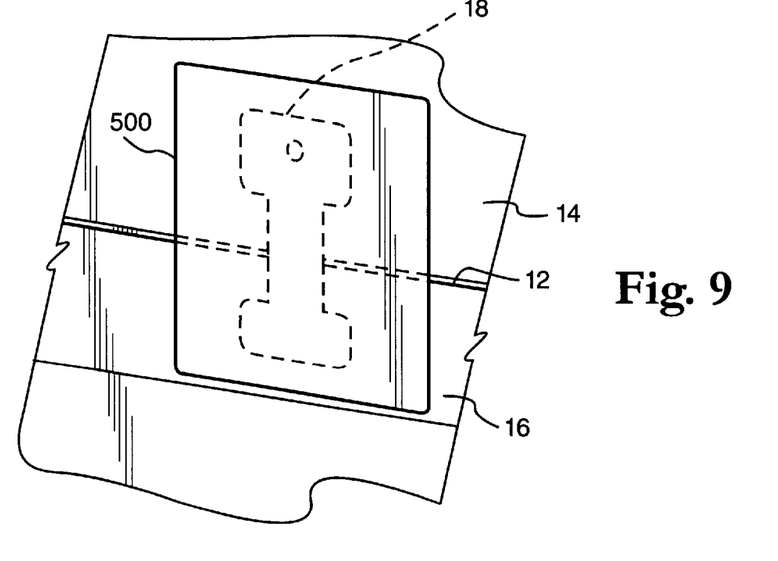
FIG. 9 is a view similar to FIG. 1 illustrating a weld reinforcement with an overlying cladding.

As illustrated in FIG. 9, the reinforcing element in any of its various forms illustrated herein may also have an overlying cladding 500. The cladding 500 seals the pocket formed between the dogbone element, for example, element 18, and the reinforced members 14 and 16. It will be appreciated that cladding 500 also eliminates the need for a clamp retainer or bolt assembly as illustrated in FIGS. 1 and 7, respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A weld reinforcement comprising:

first and second members welded to one another forming an elongated weld seam;

a continuous pocket formed in said members opening through corresponding surfaces thereof and defining first and second pocket portions on opposite sides of said weld seam, said first pocket portion adjacent one end of said pocket having a laterally enlarged recess spaced from said seam and a laterally reduced portion adjoining said seam, said second pocket portion having a laterally reduced portion adjacent said seam;

one of said pocket portions in one of said members having a projection extending from a base of said one pocket portion and in a direction toward the surface of said one member;

a reinforcing element including laterally enlarged end portions connected to one another by a laterally reduced intermediate portion, one of said enlarged end portions of said element being received in said first pocket portion with said reduced intermediate portion of said element in said reduced pocket portions scanning said weld seam; and a retainer engaging said projection to retain said element in said pocket spanning said weld seam; said one enlarged end portion of said element having an opening for receiving said projection, said retainer being received in said opening and about said projection.

2. A weld reinforcement according to claim 1 wherein said second pocket portion includes a laterally enlarged recess spaced from said weld seam, said enlarged end portions of said element being received in said first and second pocket portions, respectively, with said reduced intermediate portion of said element spanning said weld seam.

3. A weld reinforcement according to claim 2 wherein said base has a through-opening to a second surface of said first member opposite the first-mentioned surface, said projection being received through said opening for engagement by a retainer clamp.

4. A weld reinforcement according to claim 1 wherein said retainer includes a sleeve, an annular wedge about said sleeve and a driver screwthreaded to said sleeve such that such wedge is drawn about said sleeve in response to threading said driver and said sleeve relative to one another thereby securing said element and said projection to one another.

5. A weld reinforcement according to claim 1 wherein said first and second members are angularly related to one another, another of said enlarged end portions of said element engaging said second member along an angularly related surface thereof.

6. A weld reinforcement according to claim 1 wherein said element is formed of a material having a coefficient of thermal expansion lower than the coefficient of thermal expansion of said first and second members, enabling a load perpendicular to the weld seam to be carried as a tensile load along the element.

7. A weld reinforcement comprising:

first and second members welded to one another forming an elongated weld seam;

a continuous pocket formed in said members opening through corresponding surfaces thereof and defining first and second pocket portions on opposite sides of said weld seam, said first pocket portion adjacent one end of said pocket having a laterally enlarged recess spaced from said seam and a laterally reduced portion adjoining said seam, said second pocket portion having a laterally reduced portion adjacent said seam;

one of said pocket portions in one of said members having a projection extending from a base of said one pocket portion and in a direction toward the surface of said one member;

a reinforcing element including laterally enlarged end portions connected to one another by a laterally reduced intermediate portion, one of said enlarged end portions of said element being received in said first pocket portion with said reduced intermediate portion of said element in said reduced pocket portions spanning said weld seam; and a retainer engaging said projection to retain said element in said pocket spanning said weld seam;

said one pocket portion having at least one edge extending generally parallel to the elongated weld seam and tapering away from said one pocket portion in a direction from said base to the surface of said first member.

8. A weld reinforcement comprising:

first and second members welded to one another forming an elongated weld seam;

a continuous pocket formed in said members opening through corresponding surfaces thereof and defining first and second pocket portions on opposite sides of said weld seam, said first pocket portion adjacent one end of said pocket having a laterally enlarged recess spaced from said seam and a laterally reduced portion adjoining said seam, said second pocket portion having a laterally reduced portion adjacent said seam;

one of said pocket portions in one of said members having a projection extending from a base of said one pocket portion and in a direction toward the surface of said one member;

a reinforcing element including laterally enlarged end portions connected to one another by a laterally reduced intermediate portion, one of said enlarged end portions of said element being received in said first pocket portion with said reduced intermediate portion of said element in said reduced pocket portions spanning said weld seam; and a retainer engaging said projection to retain said element in said pocket spanning said weld seam;

said one pocket portion having generally parallel edges along opposite sides thereof extending generally parallel to said elongated weld seam and tapering away from one another in a direction from said base to the surface of said first member.

9. A weld reinforcement comprising:

first and second members welded to one another forming an elongated weld seam;

a continuous pocket formed in said members opening through corresponding surfaces thereof and defining first and second pocket portions on opposite sides of said weld seam, said first pocket portion adjacent one end of said pocket having a laterally enlarged recess spaced from said seam and a laterally reduced portion adjoining said seam, said second pocket portion having a laterally reduced portion adjacent said seam;

one of said pocket portions in one of said members having a projection extending from a base of said one pocket portion and in a direction toward the surface of said one member;

a reinforcing element including laterally enlarged end portions connected to one another by a laterally reduced intermediate portion, one of said enlarged end portions of said element being received in said first pocket portion with said reduced intermediate portion of said element in said reduced pocket portions spanning said weld seam; and a retainer engaging said projection to retain said element in said pocket spanning said weld seam;

said one pocket portion having at least one edge extending generally parallel to the elongated weld seam and tapering away from said one pocket portion in a direction from said base to the surface of said first member, said one enlarged end portion of said element has at least one edge extending generally parallel to the elongated weld seam and having a taper generally complementary to the taper of said one edge of said one pocket portion.

10. A weld reinforcement comprising:

first and second members welded to one another forming an elongated weld seam;

a continuous pocket formed in said members opening through corresponding surfaces thereof and defining first and second pocket portions on opposite sides of said weld seam, said first pocket portion adjacent one end of said pocket having a laterally enlarged recess spaced from said seam and a laterally reduced portion adjoining said seam, said second pocket portion having a laterally reduced portion adjacent said seam;

one of said pocket portions in one of said members having a projection extending from a base of said one pocket portion and in a direction toward the surface of said one member;

a reinforcing element including laterally enlarged end portions connected to one another by a laterally reduced intermediate portion, one of said enlarged end portions of said element being received in said first pocket portion with said reduced intermediate portion of said element in said reduced pocket portions spanning said weld seam; and a retainer engaging said projection to retain said element in said pocket spanning said weld seam;

said laterally enlarged recess of said one pocket portion having generally parallel edges along opposite sides thereof extending generally parallel to said elongated weld seam and tapering away from one another in a direction from said base to the surface of said first member, said one enlarged end portion of said element having generally parallel edges along opposite sides thereof generally parallel to the elongated weld seam and having tapers generally complementary to the tapers of said opposite edges of said first pocket portion.

11. A weld reinforcement comprising:

first and second members welded to one another forming an elongated weld seam;

a continuous pocket formed in said members opening through corresponding surfaces thereof and defining first and second pocket portions on opposite sides of said weld seam, said first pocket portion having a laterally enlarged recess spaced from said seam and a reduced portion adjoining said seam, said second pocket portion having a laterally reduced portion adjacent said seam;

a reinforcing element including laterally enlarged end portions connected to one another by a laterally reduced intermediate portion, one of said enlarged end portions of said element being received in said first pocket portion with said reduced intermediate portion of said element in said pocket spanning said weld seam; and a cladding overlying said element and said first and second members along said surfaces thereof.

12. A weld reinforcement comprising:

first and second members welded to one another forming an elongated weld seam;

a continuous, generally dogbone-shaped pocket formed in said members opening through corresponding surfaces thereof and defining first and second laterally enlarged recesses on opposite sides of said weld seam and joined to one another by a laterally reduced intermediate pocket section overlying said seam;

a generally dogbone-shaped reinforcing element generally complementary in shape to the dogbone-shaped pocket and disposed in said pocket, said element including laterally enlarged end portions connected one to another by a laterally reduced intermediate section, said first and second pocket portions each having at least one edge extending generally parallel to the elongated weld seam and tapering away from said pocket portion in a direction from said base to the surface of said member, said enlarged end portions of said dogbone-shaped reinforcing element each having at least one edge extending generally parallel to the elongated weld seam and having a taper generally complementary to the taper of the associated pocket portion; and means for retaining said dogbone-shaped reinforcing element in said pocket.

13. A weld reinforcement according to claim 12 wherein said retaining means includes a projection extending from a base of one of said pocket portions in a direction toward the surface of the member and a retainer clamp for engaging said projection to retain said element in said pocket spanning said weld seam.

14. A weld reinforcement according to claim 12 wherein said retaining means includes a cladding overlying said surfaces of said first and second members and said element in said pocket.

15. A weld reinforcement according to claim 12 wherein said element is formed of a material having a coefficient of thermal expansion lower than the coefficient of thermal expansion of said first and second members, enabling a load perpendicular to the weld seam to be carried as a tensile load along the element.

* * * * *

UNITED STATES PATENT AND TRADEMARK OFFICE
CERTIFICATE OF CORRECTION

PATENT NO.   : 6,345,927 B1
DATED        : February 12, 2002
INVENTOR(S)  : Pao et al.

It is certified that error appears in the above-identified patent and that said Letters Patent is hereby corrected as shown below:

<u>Column 2,</u>
Line 54, delete "inmcluded" and insert -- included --.

<u>Column 7,</u>
Lines 64-65, delete "scanning" and insert -- spanning --.

Signed and Sealed this

Fourth Day of June, 2002

*Attest:*

*Attesting Officer*

JAMES E. ROGAN
*Director of the United States Patent and Trademark Office*